United States Patent Office 3,346,532
Patented Oct. 10, 1967

---

3,346,532
ELASTOMERIC COPOLYMERS FROM DIHYDRIC PHENOLS AND ORGANIC DIEPOXIDES, THEIR PREPARATION AND CURE
Charles E. Greene, Akron, and Willem J. van Essen, Tallmadge, Ohio, assignors to The General Tire & Rubber Company, Akron, Ohio, a corporation of Ohio
No Drawing. Filed Sept. 11, 1962, Ser. No. 222,939
18 Claims. (Cl. 260—37)

ABSTRACT OF THE DISCLOSURE

An elastomeric material comprising the reaction product of (A) a component consisting essentially of dihydric phenols having an average molecular weight ranging from 110 to about 140 and (B) a component consisting essentially of organic diepoxides having an average molecular weight no greater than about 1000, each organic diepoxide having the general formula

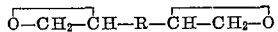

in which R is a divalent organic radical free of any function reactive to phenolic hydroxyl groups and containing in the main chain at least about six atoms selected from the group consisting of at least four carbon atoms and ethereal oxygen atoms, the ratio of said oxygen atoms to said carbon atoms being no greater than 1:2, at least 70% of all the carbon atoms in the R radicals of the diepoxides in component (B) being acyclic, in the presence of a tertiary amine and at a temperature sufficient to effect reaction between (A) and (B), for example at 100–150° C., until the reaction product has a Williams Plasticity number of at least about 50. These reaction products can be mixed with reinforcing fillers like carbon black and cured with amino-formaldehyde resins and oil-soluble condensation products thereof, resole resins, blocked polyisocyanates and polycarboxylic acid anhydrides.

---

This invention relates to novel polyethers prepared by reacting dihydric phenols and organic diepoxides, a method of making such polyethers, the cure of these polyethers to elastomers by reacting them with resole resins, amino-aldehyde resins, polycarboxylic acid anhydrides or blocked polyisocyanates and the resulting cured elastomers.

Prior to this invention it was known that polyhydric phenols could be reacted with certain epoxy compounds to produce highly crosslinked resinous materials, but there was nothing to suggest that fluids and rubbers could be produced from such materials.

It has been discovered that linear polyethers can be made by reacting substantially equimolar amounts of certain diepoxides and dihydric phenols and that such linear polyethers when polymerized to high molecular weights can be cured to provide polyether rubbers of high tensile strength even though the uncured polymer is free of detectable epoxy groups or unsaturated groups.

The principal object of this invention is to provide new and useful polyether materials. Another object is to provide a method for preparing such materials. Another object is to provide such polyether materials in a form suitable for use in the preparation of commercially desirable rubber. Another object is to provide a system for curing such polyether materials to rubbers. These objects as well as other objects which are apparent from the following description are satisfied by this invention.

This invention includes in its scope the reaction product of (A) a component consisting essentially of dihydric phenols having an average molecular weight ranging from 110 to about 140 and (B) a component consisting essentially of organic diepoxides having an average molecular weight no greater than about 1000, preferably no greater than about 300, each organic diepoxide having the general formula

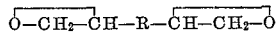

in which R is a divalent organic radical free of any function reactive to phenolic hydroxyl groups and containing in the main chain at least about six atoms selected from the group consisting of at least four carbon atoms and ethereal oxygen atoms, the ratio of said oxygen atoms to said carbon atoms being no greater than 1:2, at least 70% of all the carbon atoms in the R radicals of the diepoxides in component B being acyclic.

Component A consists essentially of dihydric phenols which includes all compounds in which there are only two hydroxyl groups, and the two hydroxyl groups are attached to aromatic rings, preferably the same aromatic ring. The simplest and preferred species are pyrocatechol, resorcinol and hydroquinone. Component A preferably consists of at least about 70% of the preferred species but can include, for example, such compounds as 3-methoxy-pyrocatechol, 3-methylpyrocatechol, 4-homopyrocatechol, 4-butyl-resorcinol, 4,6-dimethylresorcinol, 4-ethylresorcinol, 4-isoamyl resorcinol, 5-methoxyresorcinol, 2,4,6-tribromoresorcinol, mesorcinol, 2,4-dihydroxy propiophenone, 4-hexylresorcinol, cresorcinol, orcinol, resodiacetophenone, chlorohydroquinone, thymohydroquinone, toluhydroquinone, 2,6-dimethylhydroquinone, 1,3-naphthalene diol, 1,8-naphthalenediol, m,m'-bisphenol and 1,2-anthracenediol. It should be noted that the dihydric phenols which can be employed in component A can contain a variety of groups which do not interfere with the reaction of phenolic hydroxyl groups with vicinal epoxide groups. While a variety of dihydric phenols can be used in component A, their average molecular weight should be in the range of from 110 to about 140, preferably from 110 to about 115, in order to produce the products of this invention.

Component B consists essentially of organic diepoxides having an average molecular weight no greater than about 1000, each organic diepoxide having the general formula

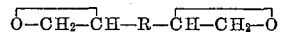

Each R is a divalent organic radical free of any function reactive to phenolic hydroxyl groups or to vicinal epoxide groups and containing in the main chain at least about six carbon atoms or at least about six carbon and ethereal oxygen atoms such that the ratio of ethereal oxygen atoms to carbon atoms is no greater than 1:2. At least about 70% of the carbon atoms in the R radicals of the organic diepoxides in component B must be acyclic carbon atoms in order to produce the fluid and rubbery products of this invention. The term "acyclic" excludes carbon atoms in aromatic rings and in cycloaliphatic rings. Where a cyclic structure is a part of the main chain of an R radical, the contribution of the cyclic structure to the chain is calculated as the fewest atoms in the cyclic structure necessary to complete the chain.

Component B can include, for example, such components as:

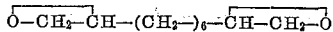
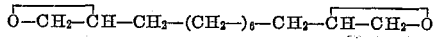
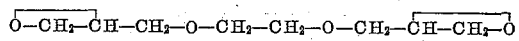
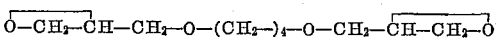
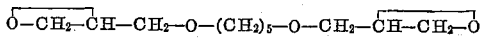

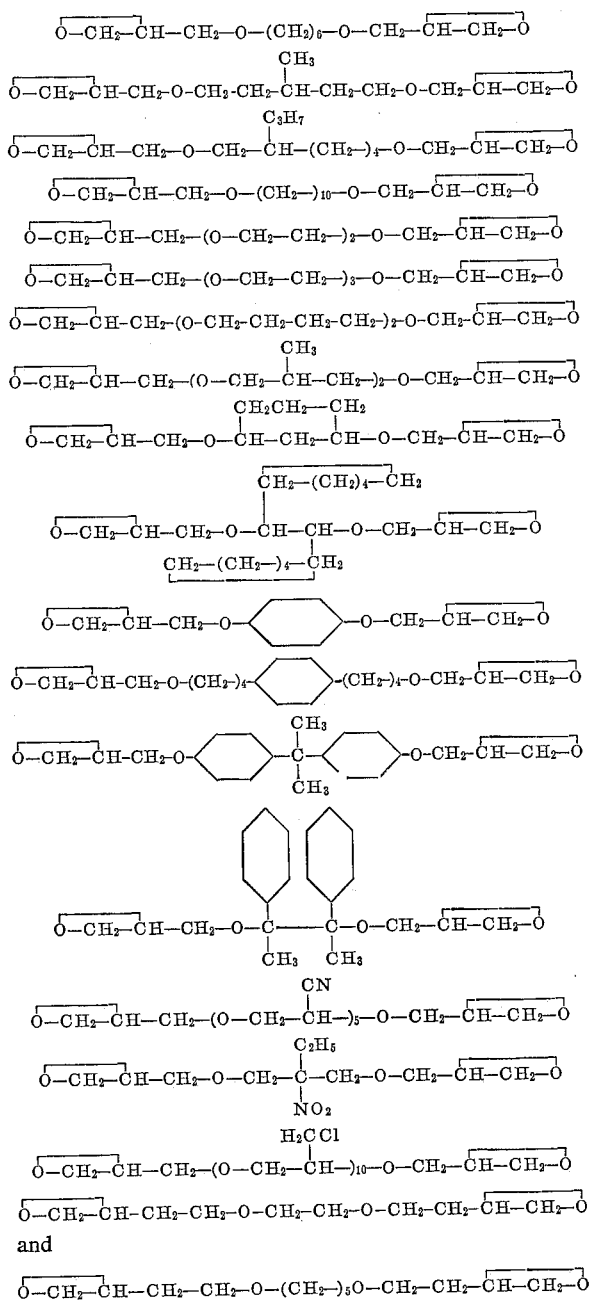

For the compositions of this invention it is preferable that the average molecular weight of the organic diepoxides in component B be no greater than about 300. High molecular weight diepoxides are operable, but they are difficult to purify. Similarly organic groups such as nitrile and nitro groups and halogen atoms can be included in the R radicals. While branched structures are permissible, it is preferable that the R radicals have essentially linear structures.

The preferred diepoxides are those of the general formulae

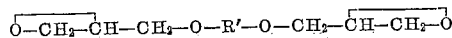

and

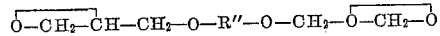

in which each R' is an alkylene radical of from 2 to about 12 carbon atoms and each R'' is an alkylene ether radical, including both mono and polyether radicals, having terminal carbon atoms and a total of from 4 to about 9 carbon atoms.

The diepoxides employed in this invention are generally well known and commercially available and are prepared by classical methods. Diepoxides such as

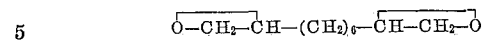

and

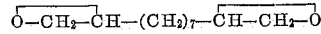

are prepared by the well-known reaction of peracetic, perbenzoic or monoperphthalic acid on 1,9-decadiene and 1,10-undecadiene respectively, adding an atom of oxygen to each ethylenic linkage. Diepoxides containing linear ether linkages as exemplified by the preferred diepoxides defined above are generally prepared by the reaction, usually with a catalyst such as BF₃, at room temperature, of a halogenated monoepoxide such as epichlorohydrin with a diol, preferably a monomeric glycol or a polyglycol, followed by dehydrohalogenation of the product with aqueous sodium hydroxide. Since the yield of diglycidyl ethers is often 50% or less and fractionation is the most convenient means of purification, it is preferable that the diglycidyl ethers have sufficiently low boiling points to permit vacuum fractionation. Consequently, it is preferable that the glycols employed in the preparation of the diglycidyl ethers have low molecular weights. For example, 1,5-pentanediol, 1,6-hexanediol and 2-butenediol-1,4-produce the diepoxides

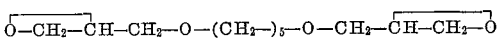

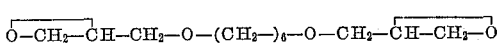

and

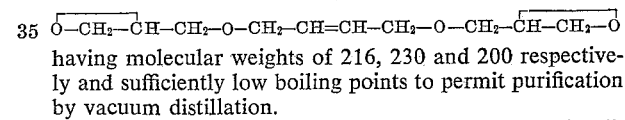

having molecular weights of 216, 230 and 200 respectively and sufficiently low boiling points to permit purification by vacuum distillation.

We have discovered that, when the predominantly aliphatic diepoxides described above are reacted with dihydric phenols, essentially linear compounds are produced. The phenolic hydroxyls apparently are much more active in reacting with epoxide groups than are the secondary alcohol groups which result from the reaction of phenolic hydroxyls and epoxide groups. These compounds are essentially linear because the epoxy groups do not react appreciably with the aliphatic secondary hydroxyl groups to form branched or crosslinked polymers. The ratio of epoxy groups to phenolic hydroxyl groups can range from about 1.1:1 to about 0.95:1 but is preferably at least 1:1. The high molecular weight rubber-grade compounds are free analytically detectable epoxide groups as compared to the previously known resinous polyepoxide compounds. A slight excess of the epoxide produces a slightly crosslinked elastomer which is easily processed and compounded on the mill. If an excess of dihydric phenol is used, a sticky polymer is formed which is extremely difficult to process.

*Example I*

In a typical polymer synthesis according to the present invention, a mixture of 700 grams of resorcinol, 1400 grams of the diglycidyl ether of 1,5-pentanediol and 5.25 grams of alpha-methylbenzyldimethylamine was heated at 110° C. with agitation until the resorcinol dissolved and the reaction exotherm had subsided. The resulting material was heated in an oven for 2½ days at 135° C. producing a solid but processable rubbery polymer having a Williams plasticity number of 135 indicating a molecular weight of at least 10,000.

The oven time can be varied from about 1 to about 7 days. The temperature can range from about 100° C. to about 150° C. The catalyst can be almost any tertiary amine, such as benzyldimethyl amine or alpha-methylbenzyldimethylamine, and is usually employed in amounts equal to from about 0.2 to about 1.0 percent by weight based on the combined weight of the epoxide and the dihydric phenol although the type and amount of catalyst may vary considerably. The greater the stearic hindrances at the tertiary nitrogen atom, the less effective is the catalytic action of the tertiary amine.

Any crosslinking, which takes place when an aliphatic hydroxyl reacts with an epoxide group to give branching in the molecule, is so small that milling of the polymeric product easily breaks down the crosslinks to produce a smooth product.

The fluid polymeric products of this invention are viscous liquids which are useful as damping fluids or in liquid springs.

For use in the preparation of rubbers the polymers of this invention should have viscosities of at least 1000 poises at 20° C., preferably over 10,000 poises at 20° C. Generally, suitable rubbery polymers have Williams plasticity numbers of at least about 50. It is preferable that the polymers of this invention have molecular weights in the range of 10,000 or more. Any of these polymers can be compounded with suitable fillers and cured to give rubbers.

The polymers of this invention can be cured by heating them at from about 250 to 400° F. with from about 3 to about 20 percent by weight based on the weight of polymer of a curing composition such as resole resins, amino aldehyde resins (such as urea-formaldehyde resins and melamine-formaldehyde resins), polycarboxylic acid anhydrides or blocked aliphatic and aromatic polyisocyanates, preferably di- and tri-isocyanates. The time of cure can vary from a few minutes to several hours depending on the temperature. The preferred temperature range is 300 to 350° F.

One of the principal types of curing composition includes the alkylol-substituted compounds resulting from the condensation of aldehydes, preferably formaldehyde with a phenol or an amino compound, e.g., urea or melamine. These alkylol-substituted compounds should contain at least two alkylol groups to react with the hydroxyl groups on the polymers and should be sufficiently compatible with the polymer to permit sufficient contact for the reaction to take place. Suitable phenol aldehyde compounds are the resole resins known as A-stage resins or polymethylol resoles. The preparation of such compounds is well-known as shown, for example, in U.S. Patent 3,028,353. Examples of such compounds include 2,6-dimethylol - 3,5 - diisopropylphenol, 2,6-dimethylol-p-cresol, 2,4-dimethylolphenol, 2,6-dimethylolphenol, 2,4,6-trimethylolphenol,

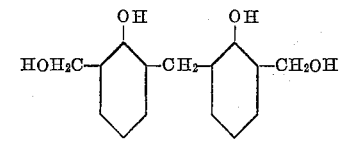

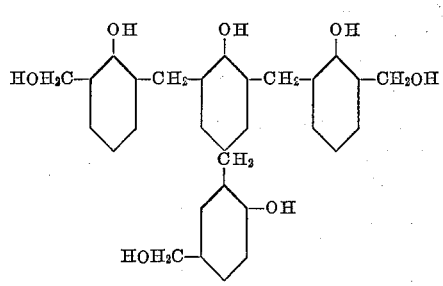

and

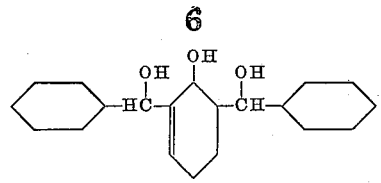

Suitable amino-aldehyde compounds are the condensation products of an amide such as urea and an aldehyde, preferably formaldehyde, known as urea-formaldehyde resins. Examples of such compounds include N,N'-dimethylolurea,

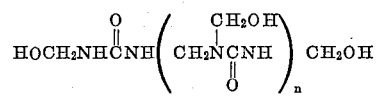

in which n is a positive integer less than about 10,

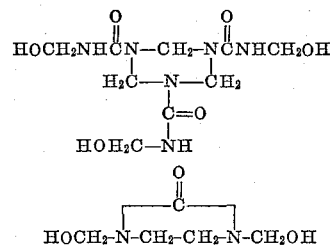

and

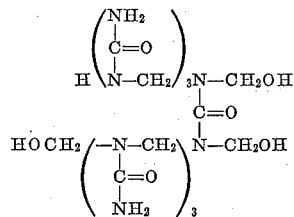

Similarly, oil-soluble derivatives of urea-aldehyde resins prepared by etherifying some of the methylol groups with an alcohol are operable as curing compounds, e.g.

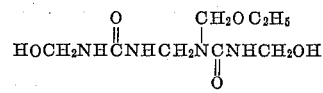

The curing compounds can also be melamine-aldehyde condensation products such as, for example, N,N',N''-trimethylolmelamine,

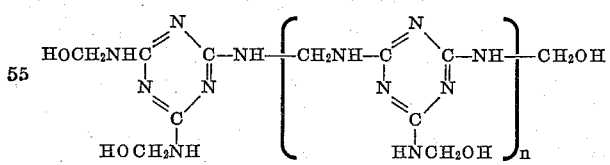

in which n is a positive integer less than about 5 and

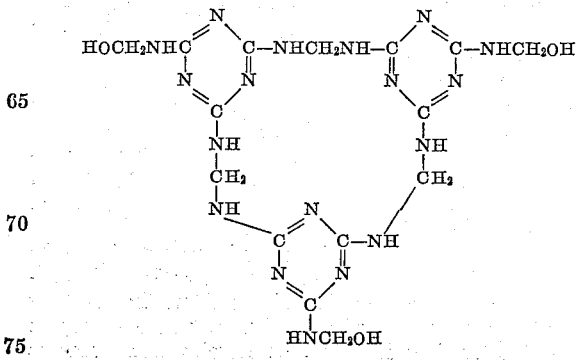

Similarly, some of the methylol groups can be etherified with an alcohol producing oil-soluble derivatives, e.g.,

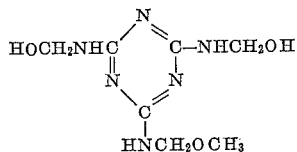

and

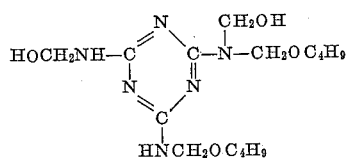

which are operable as curing compounds.

Any polycarboxylic acid anhydride such as, for example, pyromellitic acid dianhydride is a satisfactory curing compound, but care must be taken to avoid scorching.

Another major class of compounds operable as curing compounds in this invention is broadly termed as "blocked polyisocyanates." The term "polyisocyanates" is intended to include diisocyanates, triisocyanates, tetra-isocyanates and the like as well as both aromatic and aliphatic compounds. Examples of such polyisocyanates include toluene 2,4-diisocyanate, toluene 2,6-diisocyanate, diphenylmethane 4,4'-diisocyanate, p-phenylene diisocyanate, m-phenylene - diisocyanate, butylene-1,4-diisocyanate, 3,3'-dimethoxy-4,4'-biphenylene diisocyanate, benzene triisocyanate, naphthylene 2,4-diisocyanate, 3,3'-dimethyl-4,4'biphenylene diisocyanate, polymethylene polyphenyl isocyanate, cyclohexylene diisocyanate, 2-methylbutane-1,4-diisocyanate and other polyisocyanates listed in U.S. Patent Nos. 2,957,832, 2,993,869 and 3,028,353.

The polyisocyanates are "blocked" by reaction with compounds having hydrogen atoms which are sufficiently active to form complexes with isocyanates but not sufficiently active to form by-products. The simplest blocking compound is phenol. For example, 2,4-toluene diisocyanate and phenol are mixed in a molar ratio of 1:2 with a catalytic amount of a tertiary amine such as benzyl-dimethylamine. The resulting complex is a solid which can be separated. Blocking can also be accomplished with esters such as acetoacetic esters, cyanoacetic esters and malonic acid esters. In such esters the active hydrogen atom is on the carbon atom adjacent to the carbonyl group.

It is necessary to block the polyisocyanates employed as curing compositions in this invention to prevent the process of curing from taking place while the curing composition is being milled into the polymer. Heating the polymer with a blocked polyisocyanate reverses the complexing reaction and permits the resultant unblocked polyisocyanate to crosslink the polymer.

The high molecular weight polymers of this invention are elastomeric in nature. They are compounded, processed and fabricated in the same way as are conventional rubbers, such as natural, styrene-butadiene, neoprene and acrylonitrile rubbers. Thus, they can be compounded with the traditional fillers, pigments, extenders, processing aids, antioxidants and the like in addition to the novel curing agents of this invention. They can be mixed on conventional rubber mills or internal mixers and fabricated by calendering or extruding. They can be formed and cured by heat and pressure as is known to those skilled in the art.

The amount of filler which can be incorporated into the rubber based on the polymers of this invention varies depending on the particle size of the filler, the viscosity and molecular weight of the polymer, and the purpose for which the filler is added. Reinforcing fillers such as high abrasion furnace carbon black, fine channel black and fume silica are usually employed in amounts ranging from about 10 to 60 parts by weight, preferably about 25 to 50 parts, per 100 parts by weight of polymer. Non-reinforcing fillers used to extend rubbers for lower cost or easier processing, such as calcium carbonate, crushed quartz, soft clays or coarse black, can be used in any quantities up to 100 parts by weight or more per 100 parts by weight of polymer, especially when extending plasticizers are also incorporated into the polymer.

The high molecular weight polymers of this invention, when compounded, processed and cured, will give rubber vulcanizates of high tensile strength having a high order of oil resistance, thermal stability, hydrolytic resistance and ozone resistance. These properties make them especially suitable for gaskets, diaphragms, hose, conveyor belting and other industrial rubber products.

The following examples are merely illustrative and are not intended to limit this invention.

*Example II*

In this experiment six elastomeric polymers were prepared by the procedure described in Example I above. Three polymers A, B and C were the reaction products of the diglycidyl ether of 1,5-pentanediol and hydroquinone with a 5%, 2% and 0.5% molar excess of hydroquinone, respectively. Polymers D and E were the reaction products of the diglycidyl ether of 1,5-pentanediol and resorcinol with a 2.7% molar excess of the diglycidyl ether of 1,5-pentanediol. Polymer F is a reaction product of diglycidyl ether of 3-methyl-1,5-pentanediol and resorcinol in a molar ratio of 1.006 to 1. Polymer G is a condensate of 4 mols of resorcinol, 3 mols of the diglycidyl ether of 1,5-pentanediol and 1 mol of the diglycidyl ether of triethylene glycol. The Williams plasticity of each polymer was measured.

Each of these polymers was made into a rubber stock consisting of 100 parts by weight of polymer, 25 parts by weight of a reinforcing high abrasion furnace carbon black pigment, 1 part by weight of stearic acid and a curing agent of the type and parts by weight shown in Table I. These curing agents were (H) a commercial phenol-formaldehyde resole resin consisting of 2,6-dimethylol-3,5-diisopropylphenol, (J) a phenol-blocked tolylene diisocyanate mixture of 80% weight

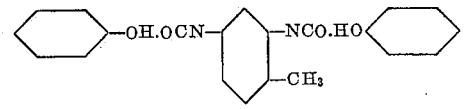

and 20% by weight

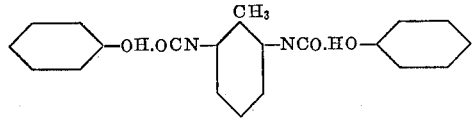

(K) a commercial melamine-formaldehyde resin consisting of a soluble derivative of trimethylol melamine partially etherified wish an alcohol and (L) a urea-formaldehyde resin having the formula:

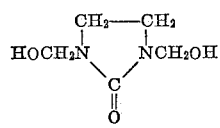

Each rubber stock was cured at 320° F. and its physical characteristics measured. Some aging data were also recorded.

TABLE I

|  | I | II | III | IV | V | VI | VII | VIII |
|---|---|---|---|---|---|---|---|---|
| Polymer | A | B | B | C | C | D | D | D |
| Williams Plasticity No | 92 | 113 | 113 | 128 | 128 | 122 | 122 | 122 |
| Curing Agent | H | H | J | H | J | H | K | J |
| Amount of Curing Agent (pts. by wt.) | 10 | 10 | 6 | 10 | 6 | 10 | 10 | 6 |
| Time of Cure (min.) | 90 | 90 | 30 | 90 | 30 | 90 | 90 | 30 |
| Tensile Strength (p.s.i.) | 2,375 | 1,675 | 2,350 | 3,375 | 2,725 | 2,400 | 2,050 | 2,125 |
| Elongation (percent) | 270 | 250 | 430 | 220 | 330 | 160 | 110 | 300 |
| Durometer Shore A | 70 | 76 | 65 | 76 | 68 | 80 | 80 | 65 |
| Aged 144 hr. at 300° F. in air: |  |  |  |  |  |  |  |  |
| Tensile Strength | 1,775 | 1,550 | 1,725 |  |  | 2,275 | 3,200 | 2,100 |
| Elongation (percent) | 100 | 100 | 100 |  |  | 90 | 60 | 110 |
| Durometer, Shore A | 93 | 90 | 81 |  |  | 95 | 95 | 95 |

|  | IX | X | XI | XII | XIII | XIV | XV | XVI | XVII |
|---|---|---|---|---|---|---|---|---|---|
| Polymer | E | E | E | E | E | E | E | F | G |
| Williams Plasticity No | 135 | 135 | 135 | 135 | 135 | 135 | 135 | 100 | 103 |
| Curing Agent | H | H | J | K | K | L | L | H | L |
| Amount of Curing Agent (pts. by wt.) | 4 | 8 | 6 | 4 | 8 | 4 | 8 | 8 | 4 |
| Time of Cure (min.) | 90 | 90 | 30 | 90 | 90 | 90 | 90 | 90 | 30 |
| Tensile Strength (p.s.i.) | 2,025 | 2,650 | 1,275 | 1,975 | 2,200 | 2,450 | 2,350 | 1,680 | 2,100 |
| Elongation (percent) | 300 | 260 | 310 | 150 | 120 | 170 | 120 | 225 | 195 |
| Durometer Shore A | 78 | 81 | 70 | 76 | 78 | 78 | 82 | 76 | 74 |
| Aged 144 hr. at 300° F. in air: |  |  |  |  |  |  |  |  |  |
| Tensile Strength | 1,525 | 2,200 | 875 | 2,375 | 3,275 | 2,575 | 4,000 | 1,500 | 1,525 |
| Elongation (percent) | 80 | 90 | 60 | 60 | 50 | 80 | 70 | 55 | 85 |
| Durometer Shore A | 89 | 95 | 90 | 95 | 100 | 95 | 100 | 95 | 86 |

*Example III*

A commercial diglycidyl ether of polyepichlorohydrin having a molecular weight of about 900 was heated with an equimolar amount of resorcinol for 18 hours at 110° C. with about 0.5% by weight of alpha-methylbenzyldimethylamine to produce a rubbery polymer having an inherent viscosity in chloroform of 0.3 equivalent to Williams plasticity number well over 100.

This polymer was mixed with 25% by weight of reinforcing carbon black and 4% of

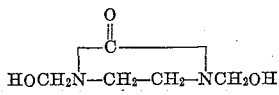

both weight percentages based on the weight of the polymer, and was heat-cured for 30 minutes at 320° F. producing a rubber vulcanizate.

*Example IV*

The diglycidyl ether of neopentylglycol was prepared by reacting one mol of neopentylgycol $$HOCH_2CMe_2CH_2OH$$

with 2 mols of epichlorohydrin and dehydrohalogenating the product with caustic. The purified diepoxide was reacted with an equimolar amount of resorcinol by heating for 64 hours at 110° C. with 0.66% by weight of α-methylbenzyldimethyl amine to produce a stiff rubbery polymer having a Williams plasticity number of over 100.

*Example V*

The diglycidyl ether of diethylene glycol was prepared by reacting one mol of diethylene glycol with two mols of epichlorohydrin and dehydrohalogenating the product with caustic. The purified diepoxide was reacted with an equimolar amount of resorcinol by heating for 18 hours at 110° C. with 0.58% by weight of α-methylbenzyldimethyl amine to produce a dry rubbery polymer having a Williams plasticity number of 109.

*Example VI*

A mixture of dihydric phenols consisting of 80 mol percent resorcinol and 20 mol percent t-butylcatechol was reacted with an equimolar amount of the diglycidyl ether of 1,5-pentanediol by heating for 72 hours at 110° C. with 0.6% by weight of α-methylbenzyldimethyl amine to produce a rubbery gum polymer having a Williams plasticity number of 156.

This polymer was mixed with 25% by weight high abrasion furnace black and 8% by weight

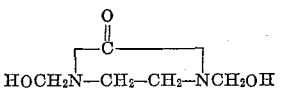

both weight percentages based on the weight of the polymer, and was heat-cured for 30 minutes at 320° F. producing a rubber vulcanizate having a tensile strength of 1875 pounds per square inch and an elongation at break of 160%.

*Example VII*

Resorcinol was reacted with an equimolar amount of an equimolar mixture of 1,5-pentanediol diglycidyl ether and 1,4-butanediol diglycidyl ether by heating for 18 hours at 110° C. with 0.5% by weight of α-methylbenzyldimethyl amine to produce a rubbery gum polymer having a Williams plasticity number over 100.

This polymer was mixed with 25% by weight high abrasion furnace black and 6% by weight of

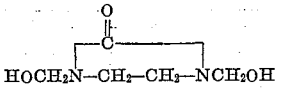

both weight percentages based on the weight of the polymer, and was heat-cured for 30 minutes at 320° F. producing a rubbery vulcanizate having a tensile strength of 2500 pounds per square inch and an elongation at break of 150%.

*Example VIII*

Epichlorohydrin was hydrolyzed in the presence of sulfuric acid to produce in excellent yield 1-chloro-2,3-dihydroxy propane. Epichlorohydrin was added dropwise to the purified 1-chloro-2,3-dihydroxy propane in contact with boron trifluoride dissolved in diethyl ether. The resulting polyepichlorohydrin mixture was then treated with excess aqueous caustic at 90° C. for four hours and distilled.

When a polyepichlorohydrin of the formula

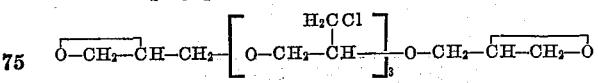

is reacted in equimolar amounts with resorcinol by the method described in Example III, there is produced a viscous copolymeric fluid which becomes a gummy polymer having a viscosity of at least 1000 poises. This polymer can be combined with 50% by weight of a high abrasion furnace carbon black based on the weight of the polymer and 6% by weight of

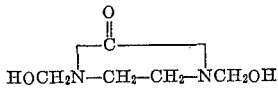

based on the weight of the polymer and heat-cured for 90 minutes at 320° F. to a rubber vulcanizate.

*Example IX*

When pyromellitic acid dianhydride is substituted weight for weight for the

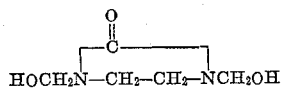

in the preparation described in Example VI, a comparable rubber vulcanizate is produced.

Having thus described our invention, what we claim is:

1. An elastomeric material being a reaction product of (A) a component consisting essentially of dihydric phenols having an average molecular weight ranging from 110 to about 140 and (B) a component consisting essentially of organic diepoxides having an average molecular weight no greater than about 1000, each organic diepoxide having the general formula

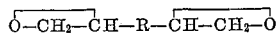

in which R is a divalent organic radical free of any function reactive to phenolic hydroxyl groups and containing in the main chain at least about six atoms selected from the group consisting of at least four carbon atoms and ethereal oxygen atoms, the ratio of said oxygen atoms to said carbon atoms being no greater than 1:2, at least 70% of all the carbon atoms in the R radicals of the diepoxides in component (B) being acyclic, in the presence of a tertiary amine catalyst and at a temperature sufficient to effect reaction between said (A) and said (B) until the reaction product has a Williams plasticity number of at least about 50.

2. An elastomeric material being a reaction product of (A) a component consisting essentially of dihydric phenols having an average molecular weight ranging from 110 to about 140 and (B) a component consisting essentially of organic diepoxides having an average molecular weight no greater than about 300, each organic diepoxide having the general formula

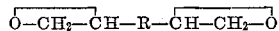

in which R is a divalent organic radical free of any function reactive to phenolic hydroxyl groups and containing in the main chain at least about six atoms selected from the group consisting of at least four carbon atoms and ethereal oxygen atoms, the ratio of said oxygen atoms to said carbon atoms being no greater than 1:2, at least 70% of all the carbon atoms in the R radicals of the diepoxides in component (B) being acyclic, in the presence of a tertiary amine catalyst at a temperature of from about 100° C. to about 150° C. until the reaction product attains a Williams plasticity number of at least about 50.

3. An elastomeric material being a reaction product of (A) a component consisting essentially of dihydric phenols having an average molecular weight ranging from 110 to about 140 and (B) a component consisting essentially of organic diepoxides having an average molecular weight no greater than about 300, each organic diepoxide having the general formula

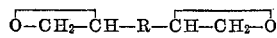

in which R is a divalent organic radical free of aliphatic unsaturation and containing in the main chain from about six to about sixteen atoms selected from the group consisting of at least four carbon atoms and ethereal oxygen atoms, the ratio of said oxygen atoms to said carbon atoms being no greater than 1:2, the remaining atoms in each R radical being selected from the group consisting of carbon atoms and hydrogen atoms, at least 70% of all the carbon atoms in the R radicals of the diepoxides in component (B) being acyclic, in the presence of a tertiary amine catalyst and at a temperature of from about 100° C. to about 150° C. until the reaction product attains a Williams plasticity number of at least about 50.

4. An elastomeric material being a reaction product of (A) a component consisting essentially of dihydric phenols having an average molecular weight ranging from 110 to about 140 and (B) a component consisting essentially of organic diepoxides each having the general formula

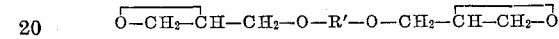

in which R' is an alkylene radical of from 2 to 12 carbon atoms in the presence of a tertiary amine catalyst and at a temperature of from about 100° C. to about 150° C. until the reaction product attains a Williams plasticity number of at least about 50.

5. An elastomeric material being a reaction product of (A) a component consisting essentially of dihydric phenols having an average molecular weight ranging from 110 to about 140 and (B) a component consisting essentially of organic diepoxides each having the general formula

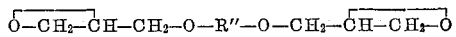

in which R" is an alkylene ether radical having terminal carbon atoms and a total of from 4 to 9 carbon atoms in the presence of a tertiary amine catalyst at a temperature of from about 100° C. to about 150° C. until the reaction product attains a Williams plasticity number of at least about 50.

6. A composition consisting essentially of the reaction product of claim 2 and from about 10 to about 60 percent by weight of a reinforcing filler based on the weight of said reaction product.

7. The composition of claim 6 in which the filler is carbon black.

8. A composition consisting essentially of the reaction product of claim 2 and from about 10 to about 60 percent by weight of a reinforcing filler based on the weight of said reaction product.

9. The composition of claim 8 in which the filler is carbon black.

10. A heat-curable composition consisting essentially of the reaction product of claim 1, from about 10 to about 60 percent by weight of a reinforcing filler based on the weight of said reaction product and from about 3 to about 20 percent by weight based on the weight of said reaction product of a curing composition selected from the group consisting of amino formaldehyde resins and oil-soluble condensation products thereof, resole resins, blocked polyisocyanates and polycarboxylic acid anhydrides.

11. A heat-curable composition consisting essentially of the reaction product of claim 3, from about 10 to about 60 percent by weight of a reinforcing filler based on the weight of said reaction product and from about 3 to about 20 percent by weight based on the weight of said reaction product of a curing composition selected from the group consisting of amino formaldehyde resins and oil-soluble condensation products thereof, resole resins, blocked polyisocyanates and polycarboxylic acid anhydrides.

12. The method which comprises heating an elastomeric material being a reaction product of (A) a component consisting essentially of dihydric phenols having an average molecular weight ranging from 110 to about 140 and (B) a component consisting essentially of organic diepoxides having an average molecular weight no greater than about 300, each organic diepoxide having the general formula

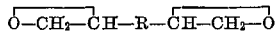

in which R is a divalent organic radical free of any function reactive to phenolic hydroxyl groups and containing in the main chain at least about six atoms selected from the group consisting of at least four carbon atoms and ethereal oxygen atoms, the ratio of said oxygen atoms to said carbon atoms being no greater than 1:2, at least 70% of all the carbon atoms in the R radicals of the diepoxides in component (B) being acyclic, in the presence of a tertiary amine catalyst at a temperature sufficient to effect reaction between said (A) and said (B) until the reaction product has attained a Williams plasticity number of at least about 50, in contact with a curing composition selected from the group consisting of amino formaldehyde resins and oil-soluble condensation products thereof, resole resins, blocked polyisocyanates and polycarboxylic acid anhydride, whereby the reaction product is cured to a rubber vulcanizate.

13. The method which comprises heating an elastomeric material being a reaction product of (A) a component consisting essentially of dihydric phenols having an average molecular weight ranging from 110 to about 140 and (B) a component consisting essentially of organic diepoxides having an average molecular weight no greater than about 300, each organic diepoxide having the general formula

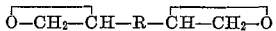

in which R is a divalent saturated aliphatic organic radical containing in the main chain at least about six atoms selected from the group consisting of at least four carbon atoms and ethereal oxygen atoms, the ratio of said oxygen atoms to said carbon atoms being no greater than 1:2, the remaining atoms in each R radical being selected from the group consisting of carbon atoms and hydrogen, in the presence of a tertiary amine catalyst at a temperature of from about 100° C. to about 150° C. until the reaction product has attained a Williams plasticity number of at least about 50, in contact with a curing composition selected from the group consisting of amino formaldehyde resins and oil-soluble condensation products thereof, resole resins, blocked polyisocyanates and polycarboxylic acid anhydrides, whereby the reaction product is cured to a rubber vulcanizate.

14. A cured elastomer of an elastomeric material being a reaction product of (A) a component consisting essentially of dihydric phenols having an average molecular weight ranging from 110 to about 140 and (B) a component consisting essentially of organic diepoxides having an average molecular weight no greater than about 300, each organic diepoxide having the general formula

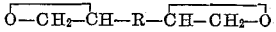

in which R is a divalent organic radical free of any function reactive to phenolic hydroxyl groups and containing in the main at least about six atoms selected from the group consisting of at least four carbon atoms and ethereal oxygen atoms, the ratio of said oxygen atoms to said carbon atoms being no greater than 1:2, at least 70% of all the carbon atoms in the R radicals of the diepoxides in component (B) being acyclic, in the presence of a teritary amine catalyst at a temperature sufficient to effect reaction between said (A) and said (B) until the reaction product has a Williams plasticity number of at least about 50.

15. A cured elastomer of an elastomeric material being a reaction product of (A) a component consisting essentially of dihydric phenols having an average molecular weight ranging from 110 to about 140 and (B) a component consisting essentially of organic diepoxides having an average molecular weight no greater than about 300, each organic diepoxide having the general formula

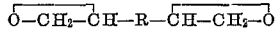

in which R is a divalent saturated aliphatic organic radical containing in the main chain at least about six atoms selected from the group consisting of at least four carbon atoms and ethereal oxygen atoms, the ratio of said oxygen atoms to said carbon atoms being no greater than 1:2, the remaining atoms in each R radical being selected from the group consisting of carbon atoms and hydrogen atoms, in the presence of a tertiary amine catalyst at a temperature of from about 100° C. to about 150° C. until the reaction product attains a Williams plasticity number of at least about 50.

16. The elastomer of claim 15 containing dispersed therein a reinforcing filler.

17. The elastomer of claim 16 in which the filler is carbon black.

18. The method for making an elastomeric material having a Williams plasticity number of at least about 50 which comprises heating an essentially aquimolar mixture of (A) a component consisting essentially of dihydric phenols having an average molecular weight ranging from 110 to about 140 and (B) a component consisting essentially of organic diepoxides having an average molecular weight no greater than about 300, each organic diepoxide having the general formula

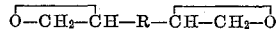

in which R is a divalent organic radical free of any function reactive to phenolic hydroxyl groups and containing in the main chain at least about six atoms selected from the group consisting of at least four carbon atoms and ethereal oxygen atoms, the ratio of said oxygen atoms to said carbon atoms being no greater than 1:2, at least 70% of all the carbon atoms in the R radicals of the diepoxides in component (B) being acyclic, in contact with (C) a tertiary amine catalyst at a temperature of at least about 100° C. but below the decomposition temperatures of the three components until a polymeric reaction product of said (A) and said (B) having said plasticity is formed.

References Cited
UNITED STATES PATENTS

| | | | |
|---|---|---|---|
| 2,503,726 | 4/1950 | Greenlee | 260—47 |
| 2,602,075 | 7/1952 | Carpenter et al. | 260—47 |
| 2,712,535 | 7/1955 | Fisch | 260—47 |
| 3,177,090 | 4/1965 | Bayes et al. | 260—47 |

OTHER REFERENCES

United States patent application, Ser. No. 46,387, filed Aug. 1, 1960, applicants R. Maycock and A. Landua, now abandoned, mentioned in USP 3,177,090.

MORRIS LIEBMAN, *Primary Examiner.*

J. E. CALLAGHAN, *Assistant Examiner.*